(12) United States Patent
Townsend

(10) Patent No.: US 9,072,212 B2
(45) Date of Patent: Jul. 7, 2015

(54) LAND-CLEARING CULTIVATOR FOR BRUSH AND THICKETS

(71) Applicant: David Clifton Townsend, Gonzales, LA (US)

(72) Inventor: David Clifton Townsend, Gonzales, LA (US)

( * ) Notice: Subject to any disclaimer, the term of this patent is extended or adjusted under 35 U.S.C. 154(b) by 0 days.

(21) Appl. No.: 13/842,966

(22) Filed: Mar. 15, 2013

(65) Prior Publication Data

US 2014/0262364 A1 Sep. 18, 2014

(51) Int. Cl.
*A01B 21/04* (2006.01)
*A01B 33/02* (2006.01)

(52) U.S. Cl.
CPC ....................... *A01B 33/02* (2013.01)

(58) Field of Classification Search
USPC ............. 172/27, 28, 138, 168, 175, 177, 178, 172/179, 180, 184, 193, 195, 540, 541, 554, 172/1, 799.5
IPC .................................. A01B 21/00,21/02, 21/04
See application file for complete search history.

(56) References Cited

U.S. PATENT DOCUMENTS

| | | | | | |
|---|---|---|---|---|---|
| 443,349 | A | * | 12/1890 | Banowetz | 172/282 |
| 876,580 | A | * | 1/1908 | Newland | 172/34 |
| 1,377,073 | A | * | 5/1921 | Hobson | 172/540 |
| 1,574,840 | A | * | 3/1926 | Murphree | 172/505 |
| 1,640,811 | A | * | 8/1927 | Spitzenberg | 172/554 |
| 2,229,497 | A | * | 1/1941 | Dontje | 172/21 |
| 2,550,085 | A | * | 4/1951 | Reeves | 172/540 |
| 2,966,218 | A | * | 12/1960 | Johnson | 172/172 |
| 5,178,078 | A | * | 1/1993 | Pendergrass | 111/128 |
| 5,613,565 | A | * | 3/1997 | Kelly | 172/21 |

FOREIGN PATENT DOCUMENTS

GB          592988          10/1947

* cited by examiner

*Primary Examiner* — Gary Hartmann
(74) *Attorney, Agent, or Firm* — Greenberg Traurig, LLP

(57) ABSTRACT

A cultivator for efficient clearing of overgrown land to prepare for planting, especially suited to operating in remote, or hard-to-maneuver-in areas, including towing by a light vehicle, comprises a frame interconnecting to hold a drum with protruding gusseted rods at right angles to the forward movement of the frame. A pair of wheels is mounted to the frame such that when the frame is flipped over, the wheels keep drum and rods from contacting ground and vegetation. A height-adjustable, removable grader bar is connected between the wheels. A trailer hitch is connected to the frame by a removable pin, reversible for towing the cultivator with the drum and rods engaging the ground for land clearing and preparation for planting, or alternatively with wheels engaging the ground for leveling ground with the grader bar or transportation. The drum's weight can vary by filling with solids or fluids.

9 Claims, 4 Drawing Sheets

LAND-CLEARING CULTIVATOR FOR BRUSH AND THICKETS

STATEMENT REGARDING FEDERALLY SPONSORED RESEARCH OR DEVELOPMENT

Research and development resulting in this invention were not federally sponsored.

BACKGROUND

Yard work or small scale cultivation often requires the use of narrow width equipment to be pulled by smaller vehicles such as the ATV which has developed a wide market in recent years. In particular, cultivating on remote plots of land, that are difficult to access and that are overgrown with vegetation into a thicket needs equipment purposefully built. Specialized designs have been developed for pull-type mowers, blades, and other equipment for use with the ATV, including equipment for aeration of the soil. Many of these devices are very complicated and it should be noted that bolts and all bolted connections, pins etc. are subject to vibration, loosening, ruining of the threads and the holes and or parts falling off.

Typically multiple pieces of equipment such as rotor tillers, bush hogs, discs, expensive tractors, operating separately in a series of operations are required to prepare the land for planting. Previous cultivation devices have included wheels integral to the design in various configurations (adjustable attachment or flip-over design) to be utilized for transportation and/or as part of the cultivation operation. Some previous cultivation devices have combined multiple equipment on the same basic frame.

Previous cultivation devices with discs have required cleared land in order to cultivate the soil; if discs were utilized on overgrown thickets and brush they would skip across the mounds of vegetation, and even a reasonable number of multiple passes would not cut through to the soil. Rotor tillers similarly require cleared land to operate efficiently, with the problem of bogging down and possibly breaking when in heavy vegetation, including roots. Bush hog solutions basically cut away the vegetation but do not remove it, and therefore yet another operation is required before using a disc or rotor tiller. Previous disclosures have provided the possibility of using a spiked cylinder arrangement limited to aeration of the soil.

However, no cultivator has been proposed which provides an effective, simple, maneuverable, and inexpensive design for attachment to a light vehicle (e.g., ATV) that is useful in clearing overgrown land in remote, difficult to access, hard-to-maneuver areas to a condition where the land could be planted.

BRIEF SUMMARY OF THE INVENTION

Embodiments of the land-clearing cultivation apparatus disclosed comprise a simple, small profile system and apparatus having essentially one moving part when engaged in the operating position, a drum with protruding rods with gussets and chopper bars which will tear and pulverize vegetation such as briars, vines, tall weeds and grasses, saplings, etc., while also tearing and pulverizing the ground/soil, and the root systems of all vegetation. A second set of moving parts are the wheels utilized during land-leveling operations or transport to the site. The third moving part is the grader bar, which is height-adjustable. The fourth moving part is the detachable trailer hitch.

In order to accomplish the same results, the prior art systems require use of a separate brush-clearing devices, separate disc, separate leveler blade and separate roller with a series of spikes than can also be provided for aeration of the soil. These multiple pieces of equipment in the prior art will not individually provide, and are not designed to, and will not work to provide the same results on the same vegetation i.e. briars, vines, tall weed and grasses, saplings, etc., and will not tear and pulverize the ground/soil, and the root systems of all vegetation as is accomplished by the disclosed embodiments.

This embodiment eliminates the need of first clearing overgrown land to prepare the land for planting. It needs no motors to function other that a use of a vehicle to pull or push it. It saves significant time, labor and the use of, and the changing of multiple pieces of equipment when tested against known traditional equipment and methods. It has only 2 bolted-on bearings that can wear out. The down-force of the drum can be adjusted for local conditions and efficient cultivation by adding or removing material such as water from the hollow core through a fill plug opening. It is economical, portable, and quick to attach to a vehicle and easy to operate.

The embodiment is pulled or pushed with a motorized vehicle such as an ATV, four wheel vehicle, tractor, side by side, etc., where the drum is rolled over the ground and forward movement is maintained the rods puncture, rip, tear the soil and roots, breaking up all vegetation being rolled over. After multiple passes (approximately 2-7 total passes, based on the amount of existing vegetation) with the apparatus over large or small areas of land, with various types of vegetation, with or without thickets, briars, vines, grasses, bushes, saplings, etc., the result is soil and vegetation that is pulverized, ready to be planted.

This embodiment can be disconnected from the vehicle hitch, and a pin on the trailer hitch on the frame can be removed, hitch can be rotated 180 degrees, pin reinserted. Then by lifting up the tongue of the frame, the device can rotate over on the 2 wheels and wheel axle. Reconnect to the vehicle and invention is ready to transport, and/or allow use of adjustable grader bar. The device is easy to maneuver on trails and around trees to get to isolated and difficult areas and is very easy to maneuver while preparing the ground/soil.

BRIEF DESCRIPTION OF THE SEVERAL VIEWS OF THE DRAWINGS

One embodiment of the invention will now be described in conjunction with the accompanying drawings in which.

DETAILED DESCRIPTION OF THE INVENTION

Figure 1:
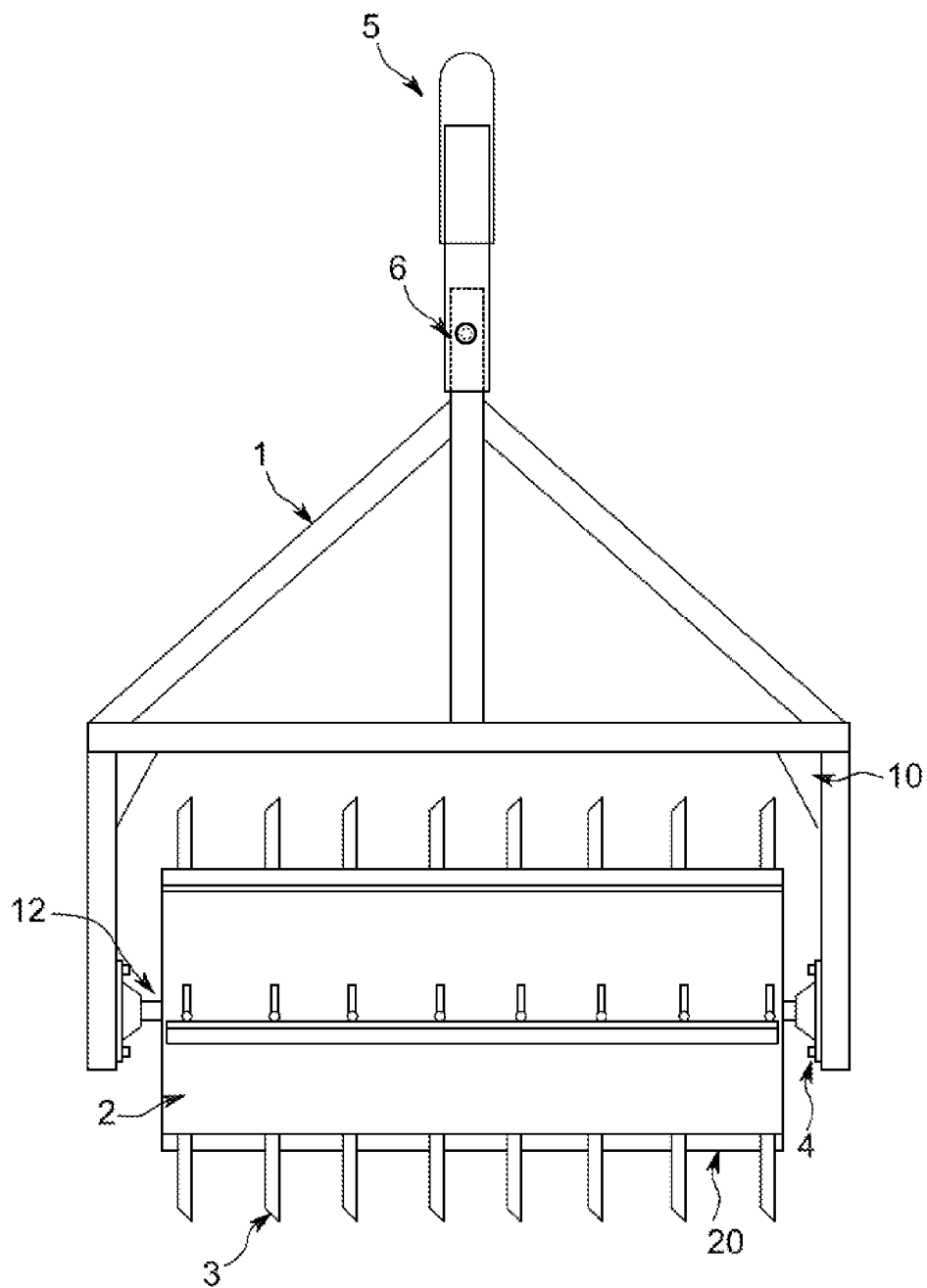
FIG. 1 is a top plan view of the cultivator according to the present invention
Figure 2:
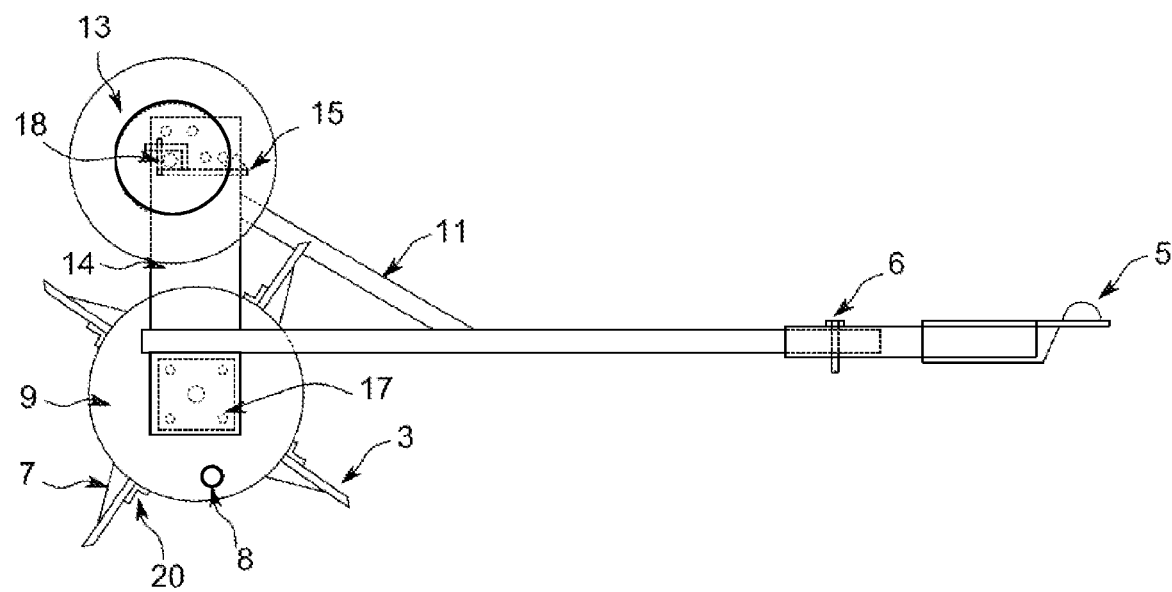
FIG. 2 is a side elevation view showing the cultivating orientation of the cultivator of FIG. 1
Figure 3:
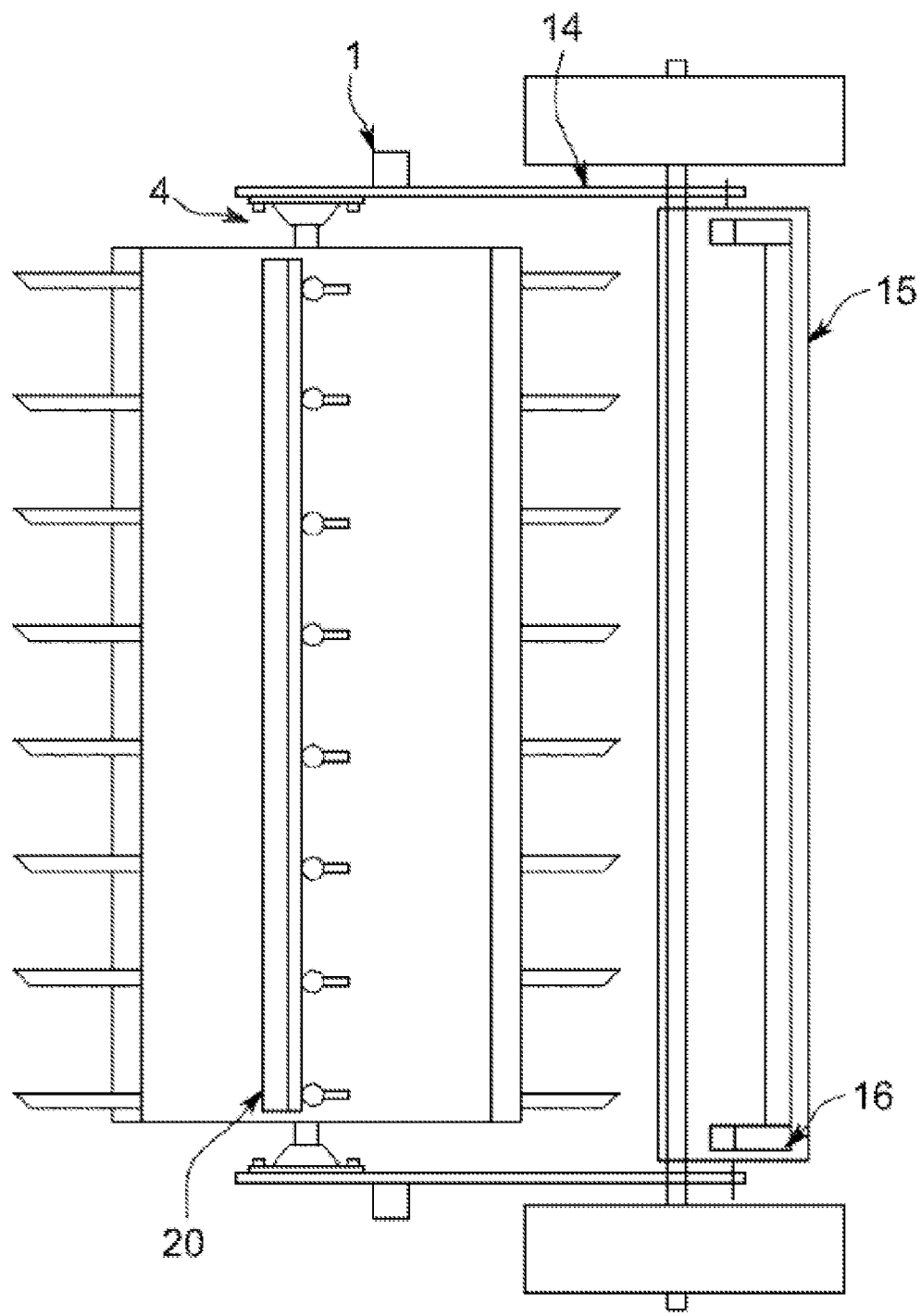
FIG. 3 is a rear elevation view of the cultivator of FIG. 1
Figure 4:
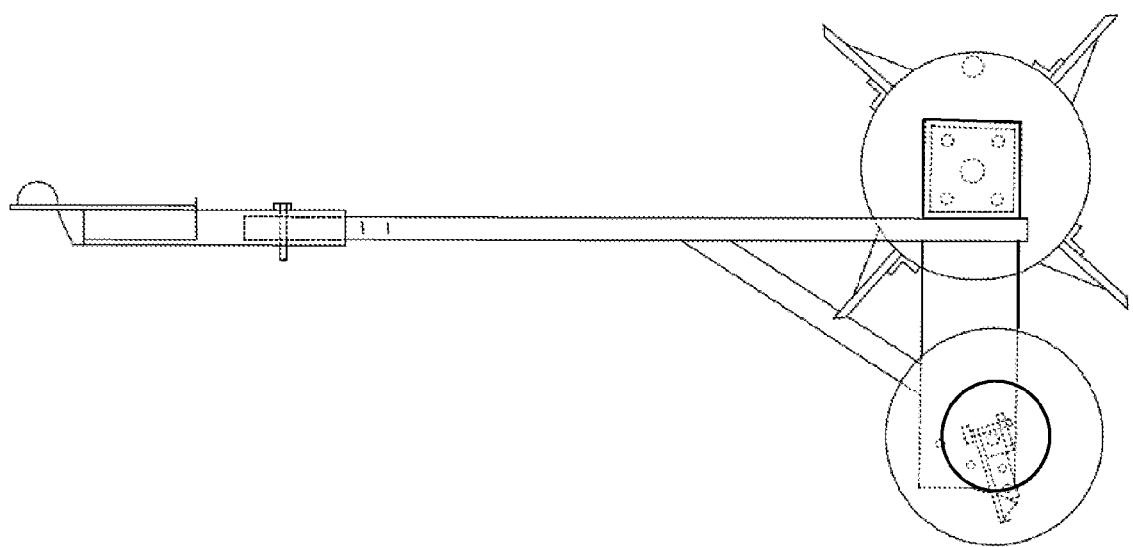
FIG. 4 is a side elevation view showing the transporting and leveling orientation with the trailer hitch reversed from the cultivator of FIG. 1

The embodiment of the cultivator shown in FIGS. 1, 2, 3, and 4 comprises a main frame 1 with two members extending to which each are attached a wheel frame 14 which are in turn are rotatably connected with bearings 4, bolted to the main frame 1 with bolts 17 at either end, to a 16" diameter cylinder cultivator drum 2, enclosed with end plates 9, which can optionally be filled with water at fill plug 8 for additional weight, with the drum 2 being mounted horizontally on a drum axle 12. Thirty two rods 3 with gussets 7 and chopper bar 20 are welded on to the drum 2 perpendicular to the axle 12. The thirty two rods 3 are 6" long, 5½" on center in 4 straight rows running parallel to the axle 12. The rods are ¾" solid metal with metal gussets (1½"×4"). The 4 straight rows of rods 3 are equally spaced around the circumference of the drum 2, with the rows of rods 3 now dividing the outside surface of the drum 2 into fourths. Each row of rods 3 are attached adjacent to an angle iron chopper bar 20 which runs the length of the row, with each of the rod's 3 gusset 7 attached to the rod opposite the chopper bar 20.

Overall dimensions of this embodiment of the cultivator are approximately 60" in width and 78" in length, allowing for storage and transportation in the bed of a pickup truck, as well as providing a small, maneuverable design either for getting to the site or for maneuvering around obstacles such as trees while clearing the land. The frames and drum assemblies are welded together from metal parts, resulting in a durable design that has few moving parts or bolts that could come loose.

The main frame 1 is removably connected to a trailer hitch 5, utilizing a pin 6 retention device whereby after the pin 6 is removed then the hitch 5 can be removed and be rotated 180 degrees, reinstalled, and pin 6 reinserted. The towing vehicle (e.g., ATV, four wheel vehicle, tractor, side by side) is presumed to have a compatible connectable trailer hitch.

The main frame 1 is strengthened against flexing by the addition of frame gussets 10 attached to the frame between the arms that hold the drum axle 12 and is connected to the adjacent frame member that is parallel to the drum axle 12.

Opposite to the side of the main frame 1 where the drum axle 12 attaches to the wheel frame 14, each wheel frame 14 is rotatably connected to a wheel 13 such that the wheel 13 is on the opposite side of the main frame 1 from the drum 2 in such a manner that the wheels 13 raise the drum 2 so it or the rods 3 do not interact with the ground during transportation or leveling operations. On this same side of main frame 1 there is a wheel frame gusset 11 extending between main frame 1 and the wheel frame 14.

Additionally, a grader bar 15 is height-adjustably connected by means of an adjustment device 16 and is removably connected by means of removing a pin 18 to the cylinder/drum wheel frame 15 located on the same side of main frame 1 as the wheels 13. The grader bar 15 is intended to ride at a height relative to the wheels 13 such that the ground may be leveled at various levels or such that it does not interact with the ground during transportation.

Techniques and advantages over currently available apparatus known to the inventor are illustrated in the following non-limiting example:

EXAMPLE 1

Preparing Two Half Acre Plots Utilizing the Traditional Method/Apparatus Compared to the Novel method/apparatus.

The traditional method of cultivating land that has grown up into a thicket is to:
1. Use a skid steer with a toothed bucket to clear all vegetation and root systems of saplings etc. (*If no saplings are present mow with a conventional farm tractor and bush hog).
2. Hand clear sticks and remaining standing saplings.
3. Disc with conventional farm tractor and disc (2 to 3 passes) or ATV with disc.
4. Disc with conventional farm tractor and disc for the second time (approximately one week later) or B.) ATV with disc.

This entire Example uses typical estimated equipment costs and hours in the experience of the inventor, as follows:
A.) Cost and time of a traditional method using: Farm tractor and disc:
 1. Skid steer* with bucket equipment costs $14,000.00 and takes 2 hours to knock down and remove vegetation, followed by
 2. Hand clearing sticks and remaining standing saplings which takes 4 hours, followed by
 3. Using a farm tractor with disc that costs $14,000.00 for 1.5 hours, followed approximately one week later by:
 4. Repeat step 3 for 1 hour.
 This results in a total estimated cost of $28000 and 8.5 hours of labor.
  *when preparing land that was cultivated the previous season, the skid steer with bucket would be substituted with farm tractor and bush hog. The cost of equipment and hours will remain the same.
B.) Cost and time of a traditional method using: ATV and disc:
 1. Skid steer* with bucket costs $14,000.00 for 2 hours, followed by
 2. Hand clearing sticks and remaining standing saplings for 4 hours, followed by
 3. Using an ATV costing $7,000.00 with disc costing $2,500.00 for 2 to 3 passes for 3 hours, followed approximately one week later by:
 4. Repeat step 3 for another 2 hours.
 This results in a total estimated cost of $23,500 and 11 hours of labor.
  *when preparing land that was cultivated the previous season, the skid steer with bucket would be substituted with farm tractor and bush hog. The cost of equipment and hours will remain the same.

The present embodiment is designed specifically to cultivate land that has grown into a thicket. The novel method is much simpler, as follows:
 1. Pull the present embodiment with an ATV or other small motorized vehicle, 2 to 7 passes.*
 2. (If required) Pull the present embodiment for the second time approximately one week later with an ATV or other small motorized vehicle, 1 to 2 passes.
Cost and time of a traditional method using: ATV and present embodiment:
 1. Use ATV costing $7,000.00 pulling present embodiment costing 2,500 for 2 hours, followed approximately one week later by:
 2. (If required) Repeat step 1 for 0.5 hours.
 This results in a total estimated cost of $9,500 and 2.5 hours of labor.
  *when preparing land that has been cultivated the previous season, the only step that would be omitted is from step number one, which would result in 2 to 3 passes.

The two half acre land clearing estimated example shown results in the present embodiment being very much more efficient and cheaper than utilizing either set of equipment from the traditional method (tractor with disc or ATV with disc). The estimates show that the Tractor method is 195% more expensive and takes 240% more time than the present embodiment. The ATV method is estimated to be 147% more expensive, and takes 340% of the time of the present embodiment.

It should be noted that another advantage is that this embodiment can accomplish in one setting what takes previous devices two separate uses separated over a week apart requiring equipment to be carried out to the site twice, or stored on site for a week. This could be a significant savings especially if the distance were long, or if the equipment were rented.

The foregoing disclosure and description of the invention are illustrative and explanatory thereof, and various changes in the details of the illustrated method may be made without departing from the spirit of the invention.

I claim:

1. A land-clearing cultivation apparatus comprising:
   (a) a main frame,
   (b) a wheel frame coupled to the main frame,
   (c) at least one cylinder cultivator drum comprising:
      (i) a rotatable drum coupled to and in adjustable engagement with the wheel frame, wherein the rotatable drum is adjustable to a cultivating position, and wherein the rotatable drum is adjustable to a storage position,
      (ii) a plurality of cultivating elements that protrude substantially perpendicular to the axle and configured to shred vegetation and pulverize ground fixed at one end to the drum,
      (iii) wherein the cultivating elements are substantially evenly spaced along a plurality of substantially straight rows along the surface of the drum, and
   (d) a removable and reconfigurable trailer hitch component coupled to the main frame, allowing for towing with the main frame in either the cultivating position or the storage position,
   wherein the removable and reconfigurable trailer hitch component and the main frame are configured to be rotated about 180 degrees to switch between the cultivating position and the storage position,
   wherein the cultivating position allows for towing the main frame such that the at least one cylinder cultivator drum shreds vegetation and pulverizes the ground, and
   wherein the storage position allows for towing the main frame using one or more wheels coupled to the wheel frame and preventing the at least one cylinder cultivator drum from contacting the ground.

2. The land-clearing cultivation apparatus of claim 1, wherein the rotatable drum comprises:
   (a) an internal cylindrical void,
   (b) end plates enclosing the cylindrical void to contain liquid or solid material, and
   (c) at least one fill plug on at least one end plate for filling the rotatable drum with the liquid or solid material.

3. The land-clearing cultivation apparatus of claim 1, further comprising an adjustable and removable grader bar coupled to the wheel frame located transversely between the wheels such that when the main frame is in the storage position, the adjustable and removable grader bar is configured to contact an uneven ground, spreading it in order to further level the uneven ground.

4. The land-clearing cultivation apparatus of claim 1, further comprising at least one chopper bar with an edge extending perpendicular to the surface of the at least one cylinder cultivator drum and a second edge located parallel to the axis of the at least one cylinder cultivator drum, wherein the at least one chopper bar is adjacent to a plurality of rods connected to the surface of the drum.

5. The land-clearing cultivation apparatus of claim 1, wherein the wheel frame and the at least one cylinder cultivator drum are coupled on opposites sides of the main frame.

6. A method for clearing plots of land generally inaccessible with industrial land clearing implements, comprising the steps of:
   providing a land-clearing cultivation apparatus comprising:
      (a) a main frame,
      (b) a wheel frame coupled to the main frame,
      (c) at least one cylinder cultivator drum comprising:
         (i) a rotatable drum coupled to and in adjustable engagement with the wheel frame, wherein the rotatable drum is adjustable to a cultivating position, and wherein the rotatable drum is adjustable to a storage position,
         (ii) a plurality of cultivating elements that protrude substantially perpendicular to the axle and configured to shred vegetation and pulverize ground fixed at one end to the drum,
         (iii) wherein the cultivating elements are substantially evenly spaced along a plurality of substantially straight rows along the surface of the drum, and
      (d) a removable and reconfigurable trailer hitch component coupled to the main frame, allowing for towing with the main frame in either the cultivating position or the storage position,
   (e) coupling the land clearing apparatus to a motorized vehicle;
   (f) adjusting the land clearing apparatus to the cultivating position;
   (g) moving the land-clearing apparatus across a surface to be cultivated, thereby causing the cultivating elements to move across the surface to cultivate the surface; shred vegetation and pulverize ground,
   (h) repeating steps (a)-(b) until a predetermined amount of the surface is cultivated, and
   (i) adjusting the land clearing apparatus to the storage position,
   wherein the removable and reconfigurable trailer hitch component and the main frame are configured to be flipped over to switch between the cultivating position and the storage position,
   wherein the cultivating position allows for towing the main frame such that the at least one cylinder cultivator drum shreds vegetation and pulverizes the ground, and
   wherein the storage position allows for towing the main frame using a plurality of wheels coupled to the wheel frame and preventing the at least one cylinder cultivator drum from contacting the ground.

7. The method according to claim 6, wherein the wheel frame and the at least one cylinder cultivator drum are coupled on opposites sides of the main frame.

8. The method according to claim 6, further comprising the step of optionally filling a sealable hollow drum with a liquid or solid material to adjust the down-force during land-clearing and cultivating.

9. The method according to claim 6, further comprising the step of utilizing a height-adjustable removable bar extending between the wheels and parallel to the axle of the wheels interacting with the ground to further level the ground as the land-clearing apparatus moves on the wheels.

* * * * *